(12) United States Patent
Tomura et al.

(10) Patent No.: US 6,984,827 B2
(45) Date of Patent: Jan. 10, 2006

(54) MEDICAL SYSTEM INCLUDING X-RAY CT APPARATUS AND NUCLEAR MEDICINE DIAGNOSTIC APPARATUS

(75) Inventors: Masatoshi Tomura, Tochigi-ken (JP); Keiji Matsuda, Tochigi-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 157 days.

(21) Appl. No.: 10/625,785

(22) Filed: Jul. 24, 2003

(65) Prior Publication Data
US 2005/0061988 A1    Mar. 24, 2005

(30) Foreign Application Priority Data
Jul. 24, 2002    (JP)    ............................. 2002-215313

(51) Int. Cl.
G01T 1/00        (2006.01)
(52) U.S. Cl. ..................................... 250/394

(58) Field of Classification Search ................ 250/394, 250/493.1, 505.1; 378/4, 21, 62, 63, 196
See application file for complete search history.

(56) References Cited

U.S. PATENT DOCUMENTS

| 4,977,585 A * | 12/1990 | Boyd ............................. 378/4 |
| 2003/0153828 A1 * | 8/2003 | Kojima et al. .............. 600/425 |
| 2004/0030246 A1 * | 2/2004 | Townsend et al. .......... 600/427 |

* cited by examiner

*Primary Examiner*—David Porta
*Assistant Examiner*—Marcus Taningco
(74) *Attorney, Agent, or Firm*—Oblon, Spivak, McClelland, Maier & Neustadt, P.C.

(57) ABSTRACT

A medical system includes an X-ray CT apparatus and a nuclear medicine diagnostic apparatus, and a partition which blocks X-ray leakage or radiation ray leakage between the X-ray CT apparatus and the nuclear medicine apparatus. The medical system may include an operation unit to set a position of a nuclear medicine image on a scanogram.

25 Claims, 6 Drawing Sheets

MEDICAL SYSTEM INCLUDING X-RAY CT APPARATUS AND NUCLEAR MEDICINE DIAGNOSTIC APPARATUS

CROSS-REFERENCE TO RELATED APPLICATIONS

This application is based upon and claims the benefit of priority from prior Japanese Patent Application No. P2002-215313 filed on Jul. 24, 2002, the entire contents of which are incorporated herein by reference.

FIELD OF THE INVENTION

The present invention relates to a medical system which includes an X-ray CT apparatus and a nuclear medicine diagnostic apparatus.

BACKGROUND OF THE INVENTION

Generally, medical diagnostic imaging apparatuses for imaging a tissue or an organ inside a patient are classified to two types. One is a physical diagnostic apparatus, and the other is functional diagnostic apparatus. Examples of physical diagnostic apparatuses include an X-ray CT apparatus, an MRI apparatus, X-ray diagnostic apparatus and an ultrasonic diagnostic apparatus, for example. On the other hand, a nuclear medicine diagnostic apparatus, such as a SPECT apparatus is an example of the functional diagnostic apparatus.

In a hospital, the physical diagnostic apparatus is usually located in a separated room (inspecting room) separate from the functional diagnostic apparatus, and each apparatus independently obtains an image. However, Japanese Patent Publication (Kokai) No. 4-105641 discloses physical diagnostic apparatus located in a same room as the functional diagnostic. In this medical system, a patient can lie on a common bed for both imaging of the physical and functional diagnostic apparatus. Otherwise, using an additional bed, each diagnostic apparatus can be separately used at the same time. Such a medical system is shown in FIG. 1, for example.

The medical system shown in FIG. 1 has an MRI apparatus 100 as the physical diagnostic apparatus and a nuclear medicine apparatus 200 as the functional diagnostic apparatus. The MRI apparatus 100 has a gantry 101, a gradient magnetic field power supply 102 and a transceiver circuit 103. The nuclear medicine apparatus 200 has a gantry 201, a detection circuit 202 and a main control unit 203. The medical system has a common bed 300 which has a plate 301, a bed controller 302 and an imaging position controller 303, and has an additional bed 400 which has an additional plate 401 and an additional bed controller 402. Moreover, the medical system has a main computer 500 which controls whole an operation based on a SPECT program and an MRI program, and a monitor 600. In the conventional medical system, it is possible to perform each imaging separately by using the additional bed. And also it is possible to obtain a same area image since the MRI apparatus 100 detects position information of the plate and the nuclear medicine apparatus 200 adjusts a position of the plate based on the detected position information.

However, the conventional medical system has several problems. In the conventional medical system, the apparatuses are not isolated from each other. For this reason, when the imaging is performed by one apparatus, it is difficult to obtain the image by the other apparatus. Moreover, since the conventional medical system uses one common main computer, it is not convenient to obtain each image by each apparatus separately. As described above, in the conventional medical system, the same area image is obtained by the MRI apparatus and by the nuclear medicine apparatus. However, the conventional medical system does not disclose how to obtain the same area image, nor especially how to set the imaging area. Moreover, the conventional medical system can obtain the same area image when a patient keeps lying on the bed. However, once the patient gets off the bed, relative position between the bed and the patient changes. Therefore, it is difficult to obtain the same area image in the case where one image is obtained on one day and the other image is obtained on another day. Thus, the patient keeps waiting until both apparatuses are available, which can impose a burden on the patient and decrease efficiency of the system.

SUMMARY OF THE INVENTION

Accordingly, one object of the present invention is to ameliorate the above-mentioned problems. To that end, according to one aspect of the present invention there is provided a medical system which includes an X-ray CT apparatus configured to detect an X-ray irradiated to an object and obtain a scanogram and an X-ray CT image of the object, a nuclear medicine apparatus configured to detect a radiation ray irradiated from radioisotope injected to the object and obtain a nuclear medicine image of the object, a partition configured to block at least one of X-rays leaking from the X-ray CT apparatus to the nuclear medicine apparatus and radiation rays leaking from the nuclear medicine apparatus to the X-ray CT apparatus, and a partition movement unit configured to move the partition.

According to another aspect of the present invention, there is provided is a medical system which includes an X-ray CT apparatus configured to detect an X-ray irradiated to an object and obtain a scanogram and an X-ray CT image of the object, a nuclear medicine apparatus configured to detect a radiation ray irradiated from radioisotope injected to the object and obtain a nuclear medicine image of the object, and an operation unit configured to set a position of the nuclear medicine image on the scanogram.

According to another aspect of the present invention, there is provided is a medical system which includes an X-ray CT apparatus configured to detect an X-ray irradiated to an object and obtain a scanogram and an X-ray CT image of the object, a nuclear medicine apparatus configured to detect a radiation ray irradiated from radioisotope injected to the object and obtain a nuclear medicine image of the object, and means for setting a position of the nuclear medicine image on the scanogram.

According to another aspect of the present invention there is provided is a method for controlling a medical system which includes detecting an X-ray irradiated to an object, obtaining a scanogram of the object based on the X-ray, setting a position of a nuclear medicine image on the scanogram, detecting a radiation ray irradiated from radioisotope injected to the object based on the position, and obtaining the nuclear medicine image of the object.

According to another aspect of the present invention, there is provided is an X-ray CT system which includes an X-ray detector configured to detect an X-ray irradiated to an object, an image unit configured to obtain a scanogram of the object based on the X-ray detected by the X-ray detector, an operation unit configured to set a position of a nuclear medicine image on the scanogram, and an output device configured to output the position to a nuclear medicine apparatus.

According to another aspect of the present invention, there is provided is a nuclear medicine system which includes an input device configured to input a scanogram obtained by the X-ray CT apparatus, an operation unit configured to set a position of a nuclear medicine image on the scanogram, a radiation ray detector configured to detect a radiation ray irradiated from radioisotope injected to the object based on the position set by the operation unit, and an image unit configured to obtain the nuclear medicine image of the object.

BRIEF DESCRIPTION OF THE DRAWINGS

A more complete appreciation of the invention and many of the attendant advantages thereof will be readily obtained as the same becomes better understood by reference to the detailed description when considered in connection with the accompanying drawings, wherein..

DETAILED DESCRIPTION OF THE INVENTION

Figure 1:
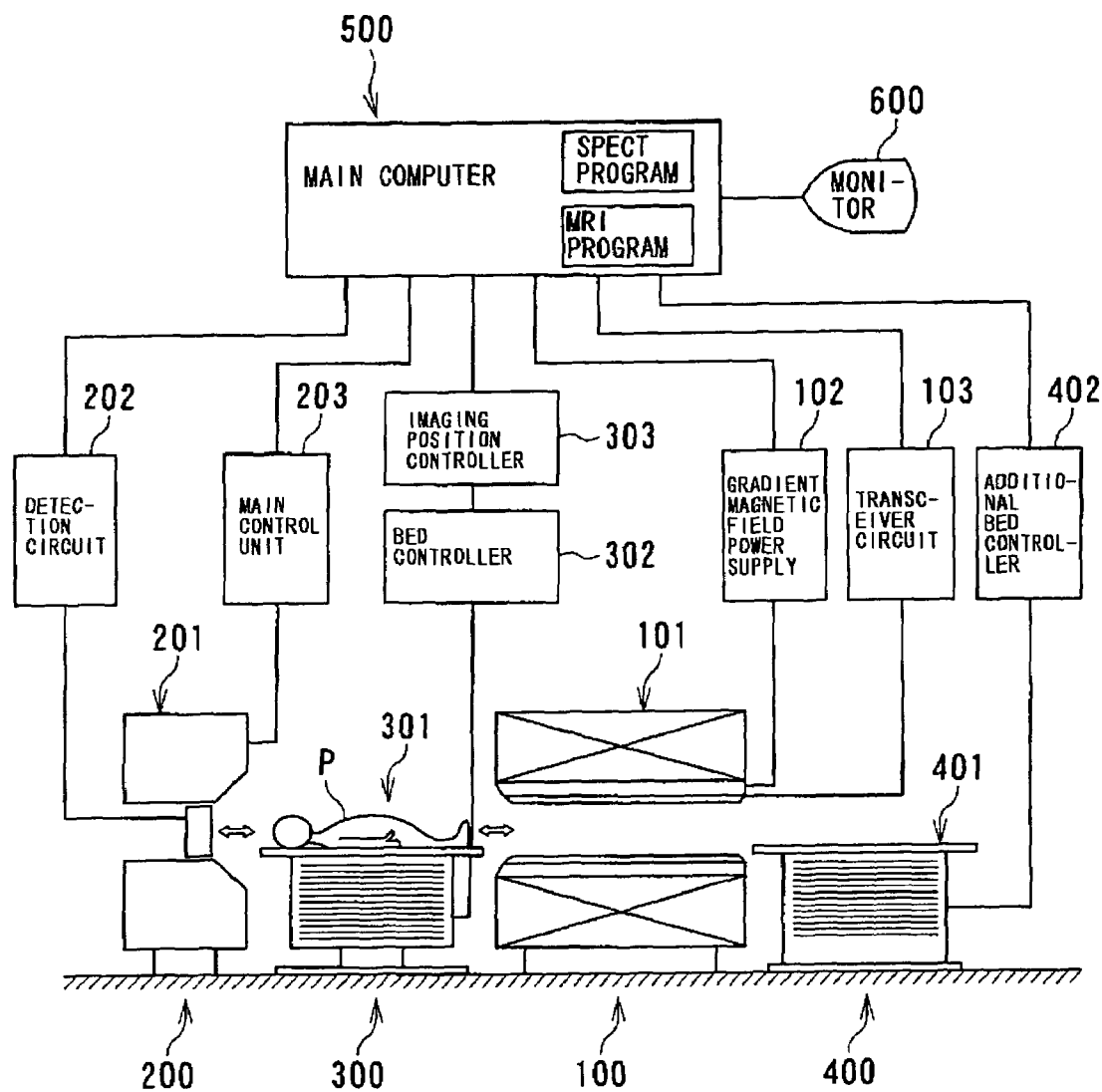
FIG. 1 is a block diagram of a conventional medical system including an MRI apparatus and a nuclear medicine diagnostic apparatus.
Figure 2:
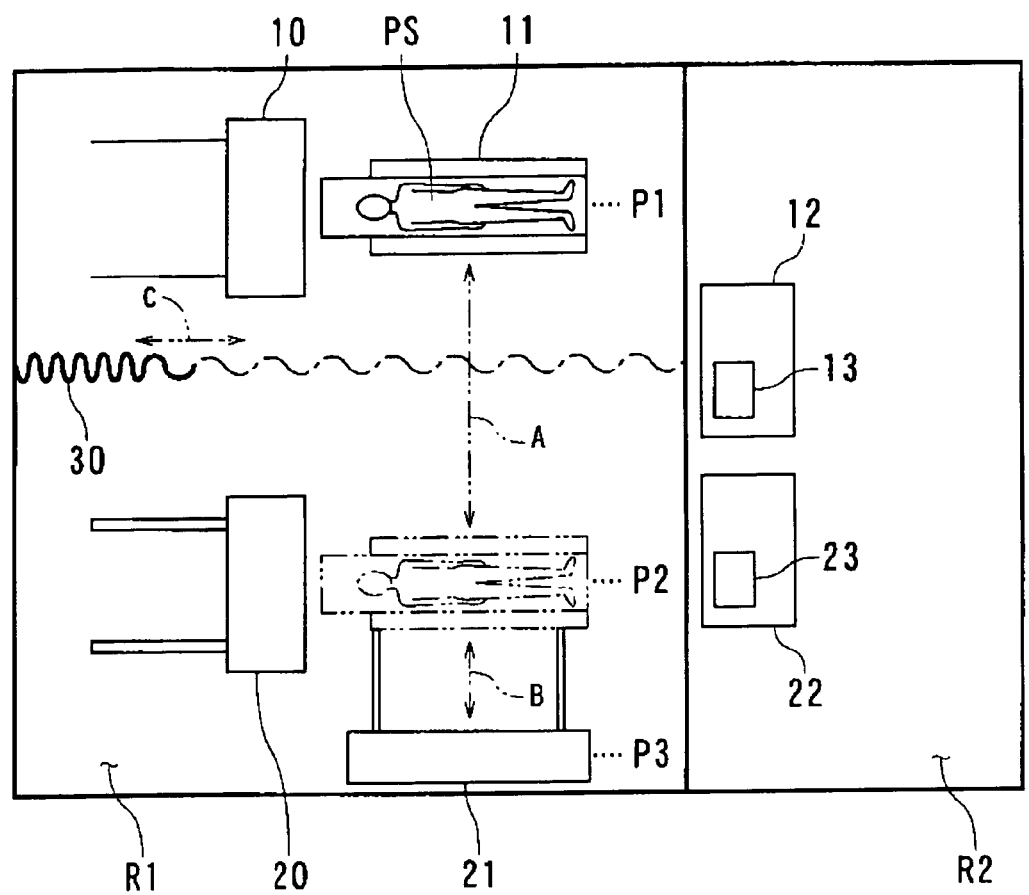
FIG. 2 is a block diagram of a medical system including an X-ray CT apparatus and a nuclear medicine diagnostic apparatus according to a first embodiment of the present invention.

Referring now to the drawings, wherein like reference numerals refer to the same or corresponding parts in the several views, a medical system including an X-ray CT apparatus and a nuclear medicine diagnosis apparatus which are separately used, is explained. As shown in FIG. 2, the X-ray CT apparatus and the nuclear medicine diagnosis apparatus are installed in one room which includes an inspection place R1 and an operation place R2. In the place R1, there is the nuclear medicine diagnosis apparatus 10 as a functional diagnostic apparatus, such as a SPECT and a bed 11 which is used for the nuclear medicine diagnosis apparatus. The bed 11 includes a plate where a patient PS lies. Also in the place R1, there is the X-ray CT apparatus 20 as a physical diagnostic apparatus and a bed 21 which is used for the X-ray CT apparatus 20. The bed 21 includes a plate where the patient PS lies. In the place R2, there is a console 12 and a monitor 13 which are used for the nuclear medicine diagnosis apparatus 10. And also, in the place R2, there is a console 22 and a monitor 23 which are used for the X-ray CT apparatus 20.

The bed 11 which is commonly used for both apparatuses moves between a position P1 for the nuclear medicine diagnosis apparatus 10 and a position P2 for the X-ray CT apparatus 20. The position P1 and P2 are indicated by path A in FIG. 2. In order to freely move the bed 11, some wheels, such as casters, which are movable in any direction on a floor, may be attached on a bottom of the bed 11. Or in order to move the bed 11, some rails may be mounted on the floor. The bed 21 for the X-ray CT apparatus 20 moves between the position P2 and a position P3 along a path B shown in FIG. 2. The bed 21 is used as an additional bed at the position P2 when the X-ray CT apparatus 20 and the nuclear medicine diagnosis apparatus 10 are used at the same time. In order to move the bed 21, the same mechanism as used to move the bed 11 may be applied.

In order to block X-rays or the radiation rays between the X-ray CT apparatus 20 and the nuclear medicine diagnosis apparatus 10, there is provided a partition in the place R1. In FIG. 2, a slidable curtain 30 including plumbum is shown as the partition. The slidable curtain 30 slides along a rail attached to a ceiling. As the partition, an openable and closable door on which the plumbum is attached maybe used instead of the curtain 30, or another type of partition, such as an attachable partition, including a material for blocking the X-ray or the radiation ray may be used. Another structure or shape may be used as the partition.

Figure 3:
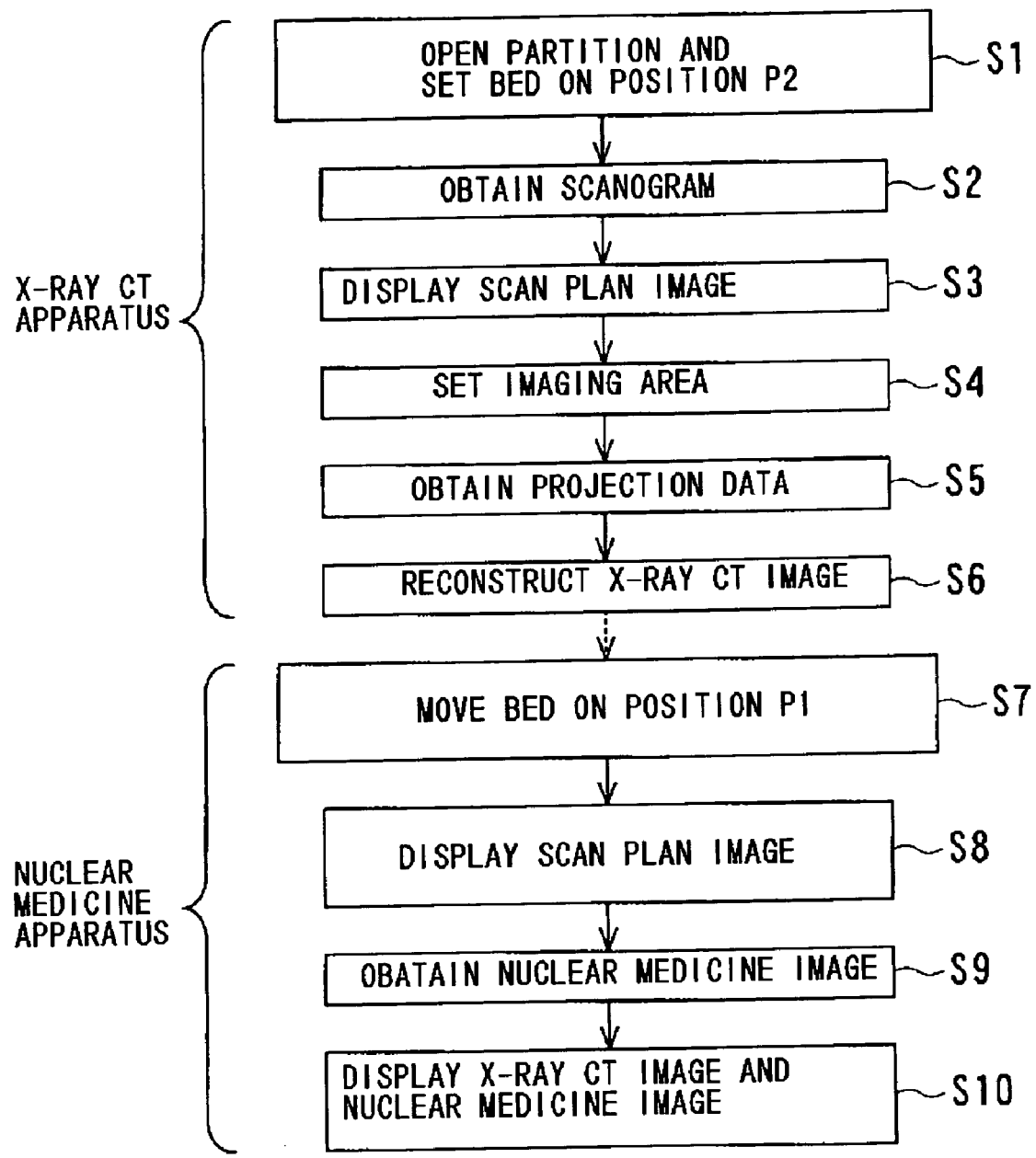
FIG. 3 is a flow chart for explaining an operation of the medical system of FIG. 2.
Figure 4A:
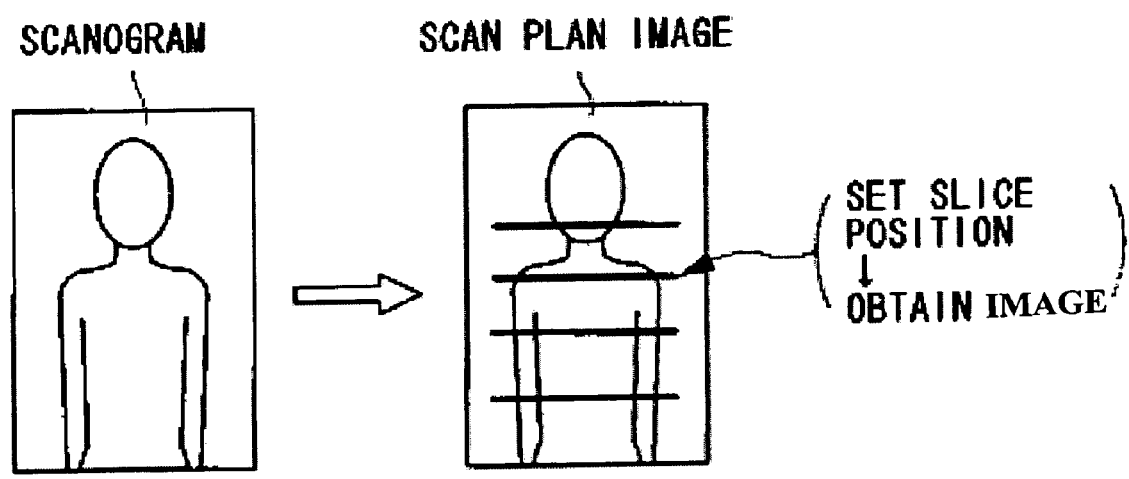
FIG. 4A is an illustration of an example displayed on a monitor of the X-ray CT apparatus.

Operation of the medical system is explained below, referring to FIG. 3 and FIG. 4. The following description is of a case where the same patient PS is imaged by the X-ray CT apparatus 20 and the nuclear medicine diagnosis apparatus 10 on the same day. In this case, the curtain 30 is open and the bed 11 is set at the position P2 near the X-ray CT apparatus 20 (Step S1). The X-ray CT apparatus 20 obtains a scanogram of the patient PS who is put on the plate of the bed 11 (Step S2). Then, while the plate moves by a predetermined distance along a longitudinal direction of the plate and a rotation unit including an X-ray tube and X-ray detector does not rotate, the X-ray is irradiated from the X-ray tube to obtain a scanogram. A scan plan image derived from the obtained scanogram is displayed on the monitor 23 (Step S3). The scan plan image is used for planning and setting a position of an X-ray CT image (slice position). An operator sets an imaging area of the patient PS, observing the scan plan image (Step S4). The X-ray CT apparatus 20 starts to scan according to the imaging area to obtain projection data (Step S5). The console 22 reconstructs the X-ray CT image based on the projection data (Step S6). The reconstructed X-ray CT image is displayed on the monitor 23 as shown in FIG. 4A.

Figure 4B:
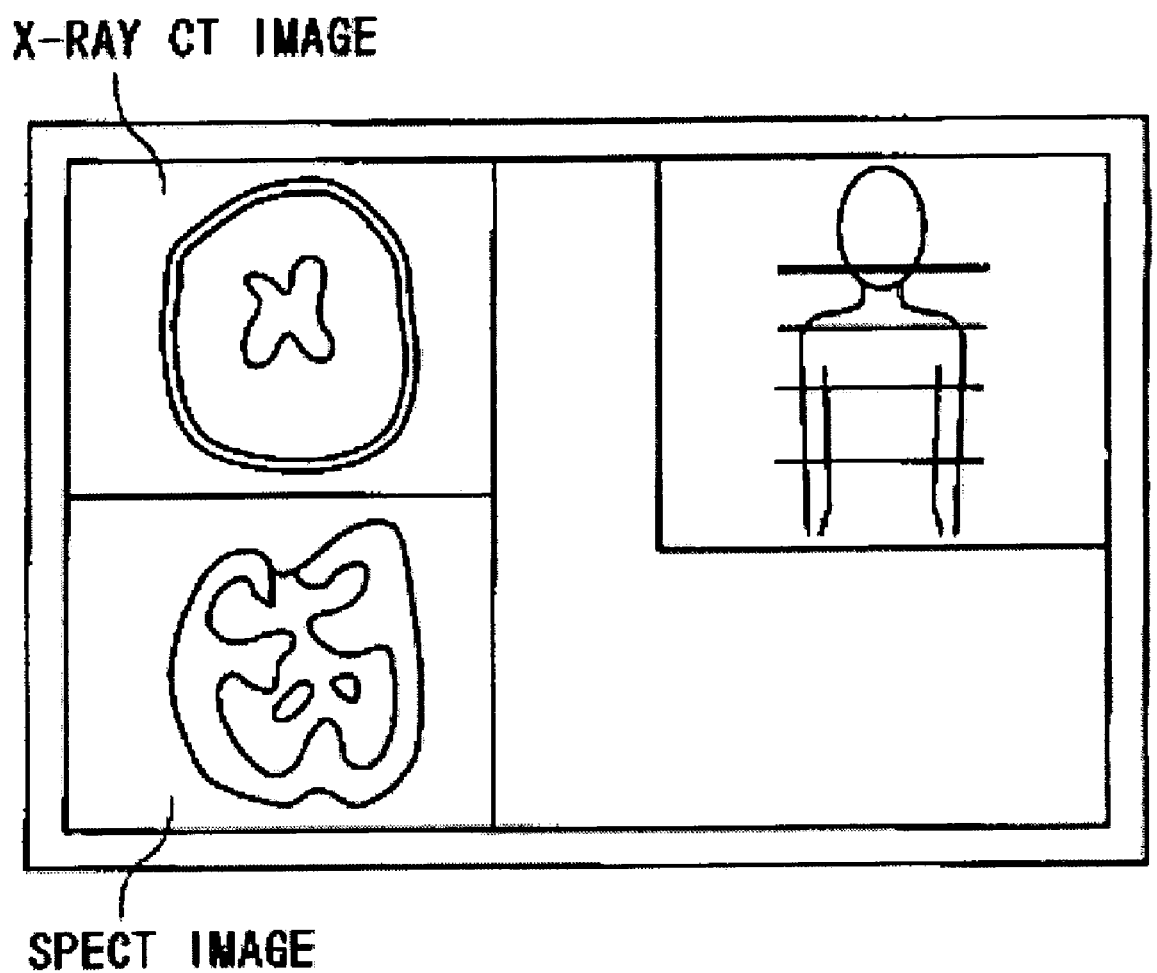
FIG. 4B is an illustration of an example displayed on a monitor of the nuclear medicine diagnosis apparatus.

The bed 11 moves from the position P2 to P1 (Step S7). The scan plan image is automatically or manually displayed at a right upper position on the monitor 13 as shown in FIG. 4B (Step S8). Observing the scan plan image, the operator may operate an operating unit, also designated as the console, 12 to adjust the imaging area, of the nuclear medicine diagnosis apparatus. After radioisotope is injected into the patient, the imaging by the nuclear medicine diagnosis apparatus 10 starts according to the imaging area and the nuclear medicine image is obtained based on a gamma ray irradiated from the radioisotope (Step S9). After the nuclear image is obtained, the operator sets a display area on the scan plan image. The X-ray CT image and the nuclear medicine image are respectively read out from the console 22 and the console 12 to be displayed at appropriate positions (easily viewable) on the monitor 13 as shown in FIG. 4B. Size of the displayed X-ray CT image may be as same as that of the nuclear medicine image. The console 12 may have a function for superimposing the X-ray CT image on the nuclear image, and the superimposed image may be displayed (Step S10). The superimposed image may be independently displayed or may be displayed with another image, such as the X-ray CT image, the scan plan image and the nuclear medicine image.

When different patients are independently examined by the nuclear medicine diagnosis apparatus 10 and the X-ray CT apparatus 20, the slidable curtain 30 is closed to separate the nuclear medicine diagnosis apparatus 10 from the X-ray CT apparatus 20. The bed 21 is used for inspection by the X-ray CT apparatus 20, and the bed 11 is used for inspection by the nuclear medicine diagnosis apparatus 10, respectively. In each inspection, a conventional method may be applied. As described above, when different patients are independently inspected by respective apparatuses 10 and 20, the slidable curtain 30 is closed. On the other hand, when one patient is inspected by both apparatuses 10 and 20, the slidable curtain 30 is open. Thus, since the partition is provided to separate each apparatus from the other apparatus in the first embodiment, each inspection can be effectively performed. Additionally, since the imaging area for the inspection by the nuclear medicine diagnosis apparatus 10 is set on the scanogram obtained by the X-ray CT apparatus 20 in the first embodiment, accuracy of positioning the imaging area for inspection by the nuclear medicine diagnosis apparatus improves, and the operator can easily understand the relationship between imaging areas of the X-ray CT apparatus and the nuclear medicine diagnosis apparatus in the first embodiment. Moreover, the accuracy of superimposing the X-ray CT image on the nuclear image may be improved. In the first embodiment, the bed 300 and the bed 400 are respectively provided as a common bed and an additional bed, and vice versa. Although the consoles 12 and 22 used for inspection by the nuclear medicine diagnosis apparatus and the X-ray CT apparatus are separated, one console having both functions may be employed.

Figure 5:
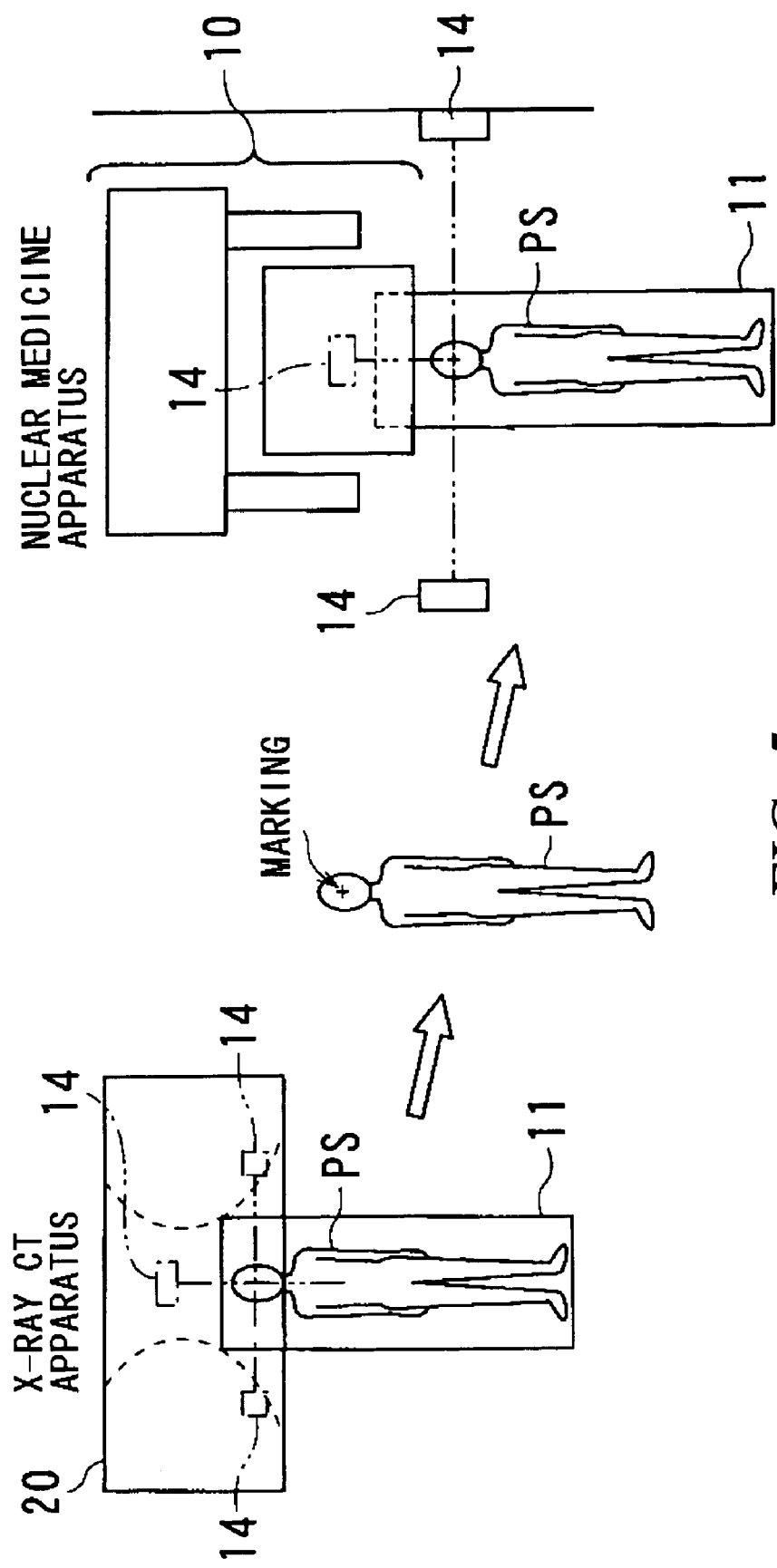
FIG. 5 is an illustration for explaining marking of a basic position by a laser marker in a second embodiment of the present invention.

A second embodiment is described below with reference to FIG. 5. In the second embodiment, a significant time interval exists between the inspections by the nuclear medicine diagnosis apparatus and the X-ray CT apparatus. The time interval may be a few minutes or may be a few days, for example. In the following description the inspection by the nuclear medicine diagnosis apparatus is not performed immediately after the inspection by the X-ray CT apparatus 20, for example. The X-ray CT image of the patient PS who is put on the bed 11 is obtained by the X-ray CT apparatus. At that time, the scanogram is obtained and the position of the X-ray CT image is set on the scan plan image created based on the scanogram, as in the first embodiment. Thus, the X-ray CT apparatus 20 starts to scan according to the imaging area to obtain projection data, and the X-ray CT image is reconstructed to be displayed on the monitor 23.

After the scanning is completed and before the patient PS is removed from the bed 11, lights emitted from three laser markers 14 which are disposed inside a gantry of the X-ray CT apparatus 20 are projected to the patient PS. Thus, three points marking is performed. In more detail, the operator marks a laser position of projected light on a surface of the patient body by a medical marker pen, such as a skin pen. After the marking, the patient waits for next instruction. When the nuclear medicine diagnosis apparatus 10 is ready, the patient enters a gantry of the nuclear medicine diagnosis apparatus 10. Lights emitted from three laser markers 14 which are disposed inside the gantry of the nuclear medicine diagnosis apparatus 10 are projected to the patient PS. The lights are superposed on the position marked by the marker pen. A basic position which is set when the scanogram is obtained, is stored as a position of the plate of the bed 11, and the marking position is stored.

Since the lights emitted from the laser markers 14 are superposed on the marking position based on the basic position, it may be possible to set the position of the nuclear medicine image on the scanogram which is obtained on another day. Thus, the patient PS is temporarily removed from the bed 11, if the nuclear medicine diagnosis apparatus 10 is not ready immediately after the inspection by the X-ray CT apparatus 20. Therefore, burden on the patient is reduced and efficiency of use of both apparatuses improves.

The present invention is not limited to the above embodiments, and various modifications may be made without departing from the spirit or scope of the general inventive concept. Of course, the nuclear medicine diagnosis apparatus includes a SPECT apparatus and a PET apparatus. And the nuclear medicine apparatus may have a semiconductor detector, such as Cd—Te or Cd—Zn—Te.

What is claimed is:

1. A medical system, comprising:
    an X-ray CT apparatus configured to detect an X-ray irradiated to an object and obtain a scanogram and an X-ray CT image of the object;
    a nuclear medicine apparatus configured to detect a radiation ray irradiated from radioisotope injected to the object and obtain a nuclear medicine image of the object;
    a partition configured to block at least one of the X-ray leaking from the X-ray CT apparatus to the nuclear medicine apparatus and the radiation ray leaking from the nuclear medicine apparatus to the X-ray CT apparatus;
    a partition movement unit configured to move the partition; and
    an operation unit configured to set a position of the nuclear medicine image on the scanogram.

2. The medical system according to claim 1, further comprising:
    a bed on which the object can be placed; and
    a bed movement unit configured to move the bed between the X-ray CT apparatus and the nuclear medicine apparatus.

3. The medical system according to claim 1, wherein the partition is attachable or slidable or openable.

4. The medical system according to claim 1, wherein the operation unit is also configured to set a position the X-ray CT image on the scanogram.

5. The medical system according to claim 4, wherein the operation unit is also configured to set the same position of the nuclear medicine image as that of the X-ray CT image.

6. The medical system according to claim 5, further comprising a display unit configured to display an image in which the X-ray CT image and the nuclear medicine image are superimposed.

7. The medical system according to claim 6, wherein the display unit displays the scanogram, the X-ray CT image and the nuclear medicine image.

8. The medical system according to claim 4, wherein:
    the X-ray CT apparatus includes a first light emission device configured to emit a first light to the object to set the position of the X-ray CT image; and
    the nuclear medicine apparatus includes a second light emission device configured to emit a second light to the object to set the position of the nuclear medicine image.

9. The medical system according to claim 8, further comprising a control unit configured to set a basic position when the position of the first light is the same as the position of the second light.

10. The medical system according to claim 4, wherein the nuclear medicine apparatus is a SPECT apparatus.

11. The medical system according to claim 4, wherein the nuclear medicine apparatus is a PET apparatus.

12. A medical system, comprising:
- an X-ray CT apparatus configured to detect an X-ray irradiated to an object and obtain a scanogram and an X-ray CT image of the object;
- a nuclear medicine apparatus configured to detect a radiation ray irradiated from radioisotope injected to the object and obtain a nuclear medicine image of the object; and
- an operation unit configured to set a position of the nuclear medicine image on the scanogram.

13. The medical system according to claim 12, wherein the operation unit is also configured to set a position the X-ray CT image on the scanogram.

14. The medical system according to claim 13, wherein the operation unit is configured to set the same position of the nuclear medicine image as the X-ray CT image.

15. The medical system according to claim 14, further comprising a display unit configured to display an image in which the X-ray CT image and the nuclear medicine image are superimposed.

16. The medical system according to claim 15, wherein the display unit displays the scanogram, the X-ray CT image and the nuclear medicine image.

17. The medical system according to claim 13, wherein:
- the X-ray CT apparatus includes a first light emission device configured to emit a first light to the object to set the position of the X-ray CT image; and
- the nuclear medicine apparatus includes a second light emission device configured to emit a second light to the object to set the position of the nuclear medicine image.

18. The medical system according to claim 17, further comprising a control unit configured to set a basic position when the position of the first light is the same as the position of the second light.

19. The medical system according to claim 13, wherein the nuclear medicine apparatus is a SPECT apparatus.

20. The medical system according to claim 13, wherein the nuclear medicine apparatus is a PET apparatus.

21. A medical system, comprising:
- an X-ray CT apparatus configured to detect an X-ray irradiated to an object and obtain a scanogram and an X-ray CT image of the object;
- a nuclear medicine apparatus configured to detect a radiation ray irradiated from radioisotope injected to the object and obtain a nuclear medicine image of the object; and
- means for setting a position of the nuclear medicine image on the scanogram.

22. The medical system according to claim 21, wherein the setting means comprises:
- a keyboard, mouse or trackball input device.

23. A method for controlling a medical system, comprising:
- detecting an X-ray irradiated to an object;
- obtaining a scanogram of the object based on the detected X-ray;
- setting a position of a nuclear medicine image on the scanogram;
- detecting a radiation ray irradiated from radioisotope injected to the object based on the set position; and
- obtaining the nuclear medicine image of the object.

24. An X-ray CT system comprising:
- an X-ray detector configured to detect an X-ray irradiated to an object;
- an image unit configured to obtain a scanogram of the object based on the X-ray detected by the X-ray detector;
- an operation unit configured to set a position of a nuclear medicine image on the scanogram; and
- an output device configured to output the position to a nuclear medicine apparatus.

25. A nuclear medicine system comprising:
- an input device configured to input a scanogram obtained by an X-ray CT apparatus;
- an operation unit configured to set a position of a nuclear medicine image on the scanogram;
- a radiation ray detector configured to detect a radiation ray irradiated from radioisotope injected to the object based on the position set by the operation unit; and
- an image unit configured to obtain the nuclear medicine image of the object.

* * * * *